United States Patent
Cunha et al.

(10) Patent No.: US 10,533,745 B2
(45) Date of Patent: Jan. 14, 2020

(54) FILM COOLING A COMBUSTOR WALL OF A TURBINE ENGINE

(71) Applicant: United Technologies Corporation, Farmington, CT (US)

(72) Inventors: Frank J. Cunha, Avon, CT (US); Stanislav Kostka, Jr., Northbridge, MA (US)

(73) Assignee: United Technologies Corporation, Farmington, CT (US)

( * ) Notice: Subject to any disclaimer, the term of this patent is extended or adjusted under 35 U.S.C. 154(b) by 222 days.

(21) Appl. No.: 15/113,558

(22) PCT Filed: Feb. 3, 2015

(86) PCT No.: PCT/US2015/014277
§ 371 (c)(1),
(2) Date: Jul. 22, 2016

(87) PCT Pub. No.: WO2015/117137
PCT Pub. Date: Aug. 6, 2015

(65) Prior Publication Data
US 2017/0009988 A1      Jan. 12, 2017

Related U.S. Application Data

(60) Provisional application No. 61/935,146, filed on Feb. 3, 2014.

(51) Int. Cl.
*F23R 3/00* (2006.01)
*F02C 7/18* (2006.01)
(Continued)

(52) U.S. Cl.
CPC ............... *F23R 3/002* (2013.01); *F02C 7/12* (2013.01); *F02C 7/18* (2013.01); *F23R 3/06* (2013.01);
(Continued)

(58) Field of Classification Search
CPC .... F23R 3/002; F23R 3/04; F23R 3/06; F23R 2900/03042; F23R 2900/03044;
(Continued)

(56) References Cited

U.S. PATENT DOCUMENTS 3,572,031 A * 3/1971 Szetela .................... F23R 3/08
60/757
4,265,085 A    5/1981 Fox et al.
(Continued)

OTHER PUBLICATIONS

EP search report for EP15743044.8 dated Jan. 31, 2017.

*Primary Examiner* — Gerald L Sung
*Assistant Examiner* — Alain Chau
(74) *Attorney, Agent, or Firm* — O'Shea Getz P.C.

(57) ABSTRACT

An assembly is provided for a turbine engine. This turbine engine assembly includes a combustor wall including a shell and a heat shield. The combustor wall defines first and second cavities between the shell and the heat shield. The heat shield defines a first outlet and an elongated second outlet. The first outlet is fluidly coupled with the first cavity. The second outlet is fluidly coupled with the second cavity. The combustor wall defines one of the cavities with a tapered geometry.

20 Claims, 10 Drawing Sheets

(51) Int. Cl.
*F23R 3/06* (2006.01)
*F02C 7/12* (2006.01)

(52) U.S. Cl.
CPC ...... *F05D 2220/32* (2013.01); *F05D 2240/35* (2013.01); *F05D 2260/201* (2013.01); *F05D 2260/202* (2013.01); *F05D 2260/221* (2013.01); *F23R 2900/03042* (2013.01); *F23R 2900/03044* (2013.01)

(58) Field of Classification Search
CPC ...... F23R 3/16; F23R 3/26; F23R 3/50; F23R 3/005; F23R 2900/03041–03045; F05D 2260/201; F05D 2260/202; F05D 2260/221; F05D 2260/2212; Y02T 50/675; F01D 5/187; F01D 25/12; F02C 7/12; F02C 7/18
See application file for complete search history.

(56) References Cited

U.S. PATENT DOCUMENTS

| | | | | |
|---|---|---|---|---|
| 4,292,810 | A * | 10/1981 | Glenn | F23R 3/002 60/757 |
| 4,302,941 | A * | 12/1981 | DuBell | F23R 3/002 60/757 |
| 4,567,730 | A * | 2/1986 | Scott | F23R 3/007 60/752 |
| 4,628,694 | A | 12/1986 | Kelm et al. | |
| 4,695,247 | A * | 9/1987 | Enzaki | F23R 3/002 431/351 |
| 4,805,397 | A | 2/1989 | Barbier et al. | |
| 5,083,422 | A * | 1/1992 | Vogt | F01D 5/188 60/752 |
| 5,461,866 | A | 10/1995 | Sullivan et al. | |
| 5,467,815 | A * | 11/1995 | Haumann | F01P 1/02 165/109.1 |
| 5,687,572 | A * | 11/1997 | Schrantz | F23R 3/007 431/352 |
| 5,758,503 | A | 6/1998 | DuBell et al. | |
| 5,758,504 | A * | 6/1998 | Abreu | F23R 3/002 60/754 |
| 5,779,438 | A | 7/1998 | Wilfert | |
| 5,799,491 | A * | 9/1998 | Bell | F23R 3/002 60/752 |
| 6,122,917 | A * | 9/2000 | Senior | F23R 3/002 165/908 |
| 6,134,877 | A * | 10/2000 | Alkabie | F23R 3/002 60/748 |
| 6,282,905 | B1 | 9/2001 | Sato et al. | |
| 6,408,628 | B1 * | 6/2002 | Pidcock | F23R 3/002 60/752 |
| 7,000,397 | B2 * | 2/2006 | Pidcock | F23R 3/002 60/752 |
| 7,093,411 | B2 | 8/2006 | Wallis | |
| 7,093,439 | B2 * | 8/2006 | Pacheco-Tougas | F23R 3/002 60/752 |
| 7,146,815 | B2 | 12/2006 | Burd | |
| 7,886,541 | B2 * | 2/2011 | Woolford | F23R 3/002 60/752 |
| 8,024,933 | B2 * | 9/2011 | Woolford | F23R 3/002 60/752 |
| 8,266,914 | B2 | 9/2012 | Hawie et al. | |
| 8,443,610 | B2 | 5/2013 | Hoke et al. | |
| 8,572,983 | B2 | 11/2013 | Xu | |
| 2002/0050237 | A1 * | 5/2002 | Becker | F23M 5/04 110/336 |
| 2007/0062198 | A1 * | 3/2007 | Huth | F23R 3/005 60/752 |
| 2007/0245742 | A1 | 10/2007 | Dahlke et al. | |
| 2008/0134683 | A1 * | 6/2008 | Foale | F23R 3/002 60/755 |
| 2010/0229563 | A1 * | 9/2010 | Woolford | F23R 3/002 60/752 |
| 2010/0287941 | A1 | 11/2010 | Kim et al. | |
| 2011/0048024 | A1 | 3/2011 | Snyder et al. | |
| 2011/0185735 | A1 | 8/2011 | Snyder | |
| 2013/0025287 | A1 | 1/2013 | Cunha | |
| 2013/0025293 | A1 | 1/2013 | Kim et al. | |
| 2014/0096528 | A1 * | 4/2014 | Cunha | F02C 7/18 60/755 |
| 2014/0116058 | A1 * | 5/2014 | Chen | F23R 3/002 60/754 |
| 2015/0292741 | A1 * | 10/2015 | Cunha | F23R 3/002 60/752 |
| 2015/0354819 | A1 * | 12/2015 | Snyder | F23R 3/005 60/782 |
| 2015/0354821 | A1 * | 12/2015 | Cunha | F23R 3/002 60/772 |
| 2015/0362192 | A1 * | 12/2015 | Cunha | F23R 3/002 60/772 |
| 2015/0369490 | A1 * | 12/2015 | Cunha | F23R 3/002 60/752 |

* cited by examiner

FILM COOLING A COMBUSTOR WALL OF A TURBINE ENGINE

This application claims priority to PCT Patent Application No. PCT/US15/014277 filed Feb. 3, 2015 which claims priority to U.S. Patent Application No. 61/935,146 filed Feb. 3, 2014, which are hereby incorporated herein by reference in their entireties.

BACKGROUND OF THE INVENTION

1. Technical Field

This disclosure relates generally to a turbine engine and, more particularly, to a combustor for a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall includes a shell and a heat shield, which defines a respective radial side of a combustion chamber. Cooling cavities extend radially between the heat shield and the shell. These cooling cavities may fluidly couple impingement apertures defined in the shell with effusion apertures defined in the heat shield.

Each combustor wall may also include a plurality of quench aperture grommets located between the shell and the heat shield. Each of these quench aperture grommets defines a respective quench aperture radially through the combustor wall. The quench aperture grommets as well as adjacent portions of the heat shield are typically subject to relatively high temperatures during turbine engine operation, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. This turbine engine assembly includes a combustor wall including a shell and a heat shield. The combustor wall defines first and second cavities between the shell and the heat shield. The heat shield defines a first outlet and an elongated second outlet. The first outlet is fluidly coupled with the first cavity. The second outlet is fluidly coupled with the second cavity. The combustor wall defines one of the cavities with a tapered geometry.

According to another aspect of the invention, another assembly is provided for a turbine engine. This turbine engine assembly includes a combustor wall including a shell and a heat shield. The combustor wall defines first and second cavities between the shell and the heat shield. The combustor wall also defines a quench aperture through the shell and the heat shield. The heat shield is configured to effuse cooling air out of the combustor wall from the first cavity. The heat shield is also configured to direct cooling air out of the combustor wall from the second cavity towards the quench aperture. The combustor wall is configured to accelerate the cooling air through the first and/or the second cavities.

According to another aspect of the invention, still another assembly is provided for a turbine engine. This turbine engine assembly includes a combustor wall including a shell and a heat shield. The combustor wall defines first and second cavities between the shell and the heat shield. The combustor wall also defines a quench aperture through the shell and the heat shield. The heat shield defines a slot therethrough adjacent, proximate or otherwise at the quench aperture, where the slot is fluidly coupled with the second cavity. The first and the second cavities are fluidly separated by a rail. The combustor wall is configured to accelerate air within the first cavity away from the intermediate rail. The combustor wall may also or alternatively be configured to accelerate air within the second cavity away from the intermediate rail.

The combustor wall may define a quench aperture through the shell and the heat shield. The heat shield may be configured to direct cooling air from the second cavity through the second outlet and towards the quench aperture.

The heat shield may define a third outlet fluidly coupled with the second cavity. The heat shield may be configured to direct additional cooling air from the second cavity through the third outlet and towards the quench aperture.

The second and the third outlets may be staggered from one another; e.g., circumferentially staggered. Alternatively, the second and the third outlets may be aligned with one another; e.g., circumferentially aligned.

The heat shield may define an elongated aperture therethrough. This aperture may at least partially form the second outlet.

The heat shield may define a plurality of apertures therethrough. These apertures may at least partially form the second outlet.

The shell and the heat shield may converge towards one another thereby at least partially defining the respective one of the cavities with the tapered geometry.

The heat shield may include a rail that partially defines the first and the second cavities.

The combustor wall may define the first cavity with a/the tapered geometry. The combustor wall may also or alternatively define the second cavity with a/the tapered geometry.

The shell may define an aperture therethrough. The shell may be configured to direct cooling air into the first cavity through the aperture to impinge against the heat shield.

The shell may define an aperture therethrough. The shell may be configured to direct cooling air into the second cavity through the aperture to impinge against the heat shield.

The heat shield may include a plurality of heat shield panels. One of the heat shield panels may define the first and the second outlets.

The first cavity may be adjacent to and upstream of the second cavity. The combustor wall may be configured to accelerate the cooling air through the first cavity. The combustor wall may also or alternatively be configured to accelerate the cooling air through the second cavity.

The shell may be configured to direct the cooling air into the first and the second cavities to impinge against the heat shield.

The shell and the heat shield may converge towards one another thereby at least partially defining the first and/or the second cavities each with a tapered geometry.

The heat shield may define an elongated aperture through which the cooling air is directed from the second cavity and to the quench aperture.

The heat shield may define a plurality of apertures through which the cooling air is directed from the second cavity and to the quench aperture.

The foregoing features and the operation of the invention will become more apparent in light of the following description and the accompanying drawings.

DETAILED DESCRIPTION OF THE INVENTION

Figure 1:
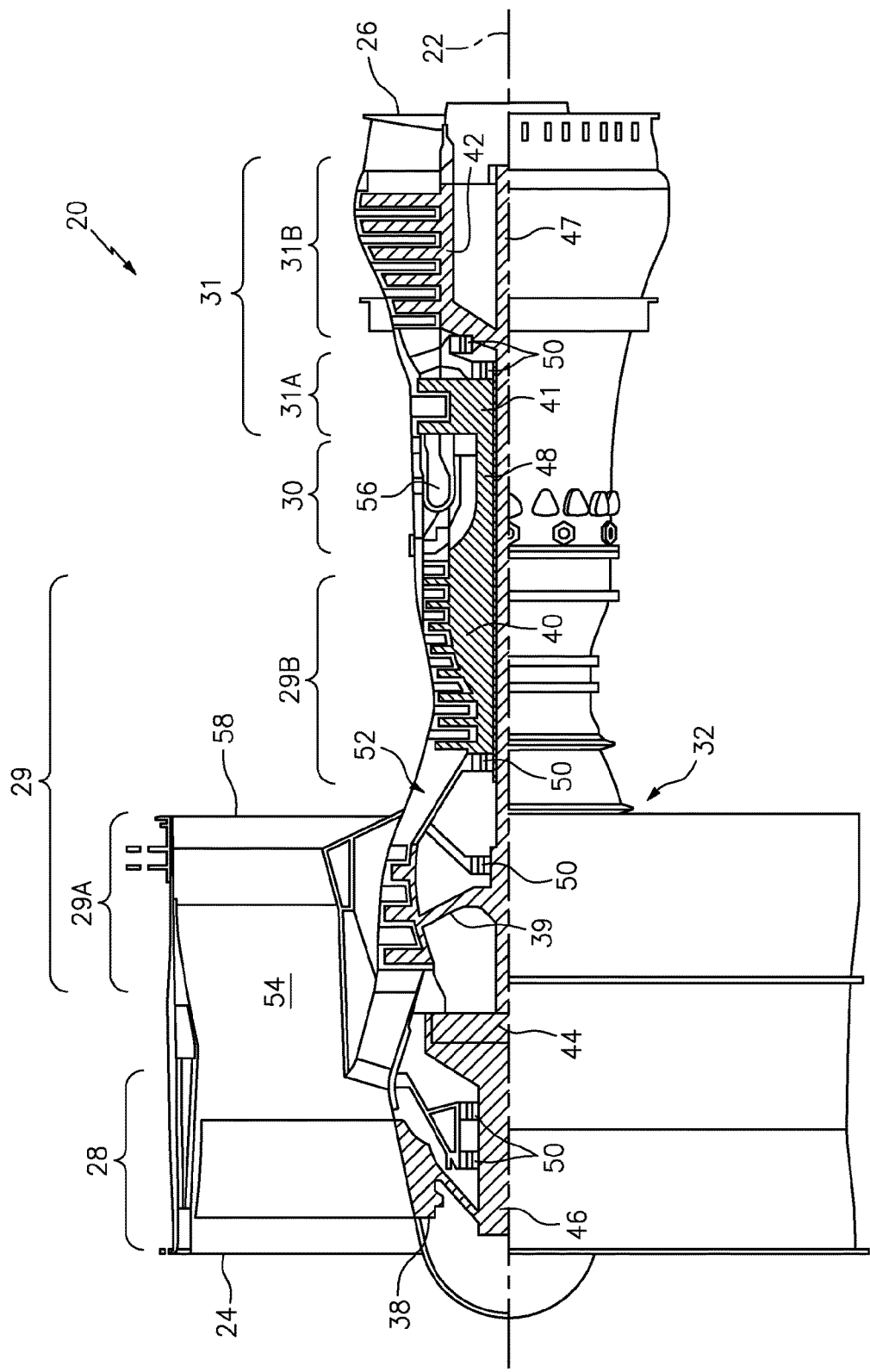
FIG. 1 is a side cutaway illustration of a geared turbine engine.

FIG. 1 is a side cutaway illustration of a geared turbine engine 20. This turbine engine 20 extends along an axial centerline 22 between a forward and upstream airflow inlet 24 and an aft and downstream core airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 32.

Each of the engine sections 28, 29A, 29B, 31A and 31B includes a respective rotor 38-42. Each of the rotors 38-42 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 38 is connected to a gear train 44 through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50. Each of the bearings 50 is connected to the engine housing 32 by at least one stationary structure such as, for example, an annular support strut.

Air enters the turbine engine 20 through the airflow inlet 24, and is directed through the fan section 28 and into an annular core gas path 52 and an annular bypass gas path 54. The air within the core gas path 52 may be referred to as "core air". The air within the bypass gas path 54 may be referred to as "bypass air".

The core air is directed through the engine sections 29-31 and exits the turbine engine 20 through the core airflow exhaust 26. Within the combustor section 30, fuel is injected into a combustion chamber 56 and mixed with the core air. This fuel-core air mixture is ignited to power the turbine engine 20 and provide forward engine thrust. The bypass air is directed through the bypass gas path 54 and out of the turbine engine 20 through a bypass nozzle 58 to provide additional forward engine thrust. Alternatively, the bypass air may be directed out of the turbine engine 20 through a thrust reverser to provide reverse engine thrust.

Figure 2:
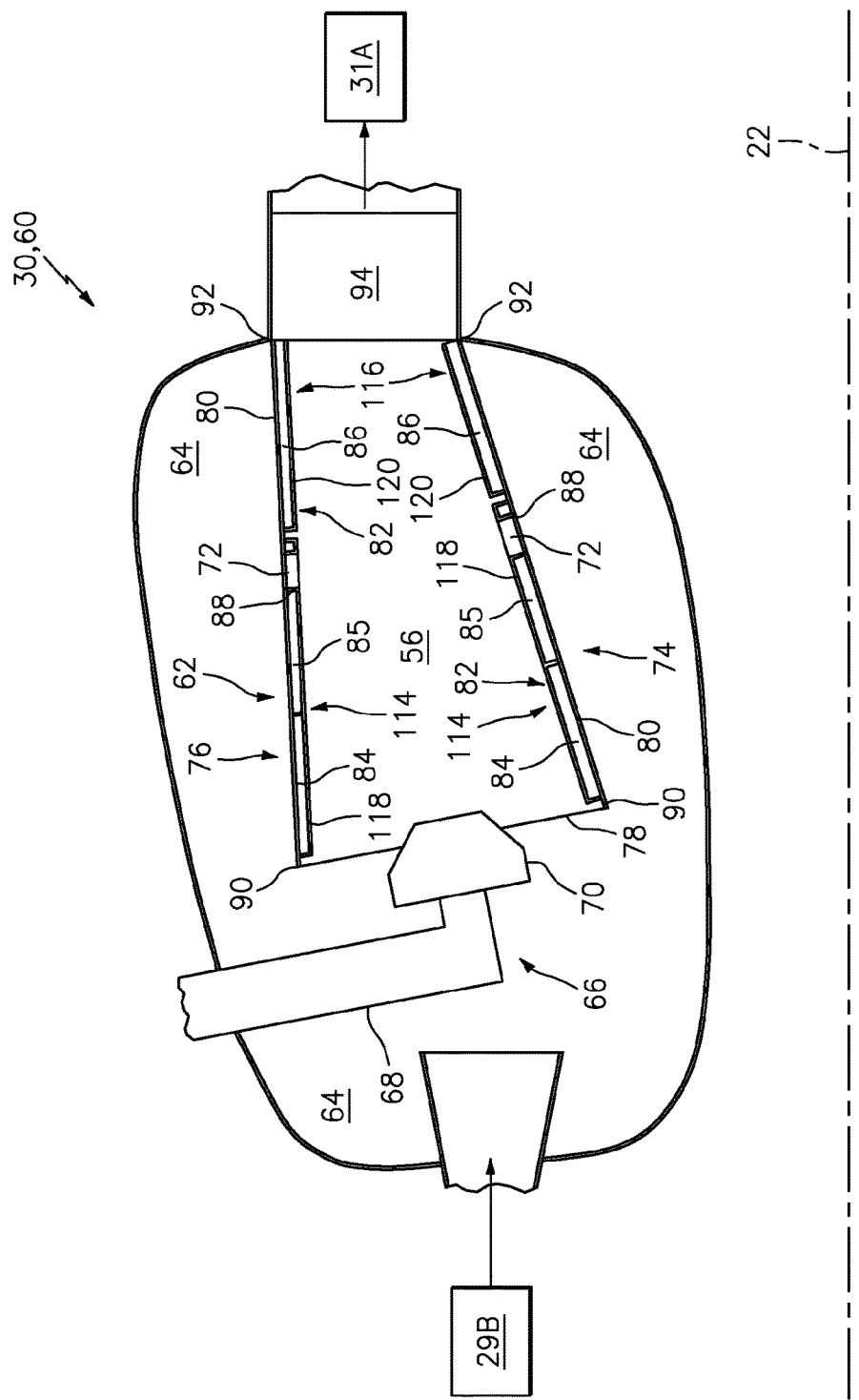
FIG. 2 is a side cutaway illustration of a portion of a combustor section.

FIG. 2 illustrates an assembly 60 of the turbine engine 20. The turbine engine assembly 60 includes a combustor 62 disposed within an annular plenum 64 of the combustor section 30. This plenum 64 receives compressed core air from the HPC section 29B, and provides the received core air to the combustor 62 as described below in further detail.

The turbine engine assembly 60 also includes one or more fuel injector assemblies 66. Each fuel injector assembly 66 may include a fuel injector 68 mated with a swirler 70. The fuel injector 68 injects the fuel into the combustion chamber 56. The swirler 70 directs some of the core air from the plenum 64 into the combustion chamber 56 in a manner that facilitates mixing the core air with the injected fuel. One or more igniters (not shown) ignite the fuel-core air mixture. Quench apertures 72 (see also FIG. 3) in walls 74 and 76 of the combustor 62 direct additional core air into the combustion chamber 56 to quench the ignited fuel-core air mixture to become, for example, stoichiometrically lean.

Figure 3:
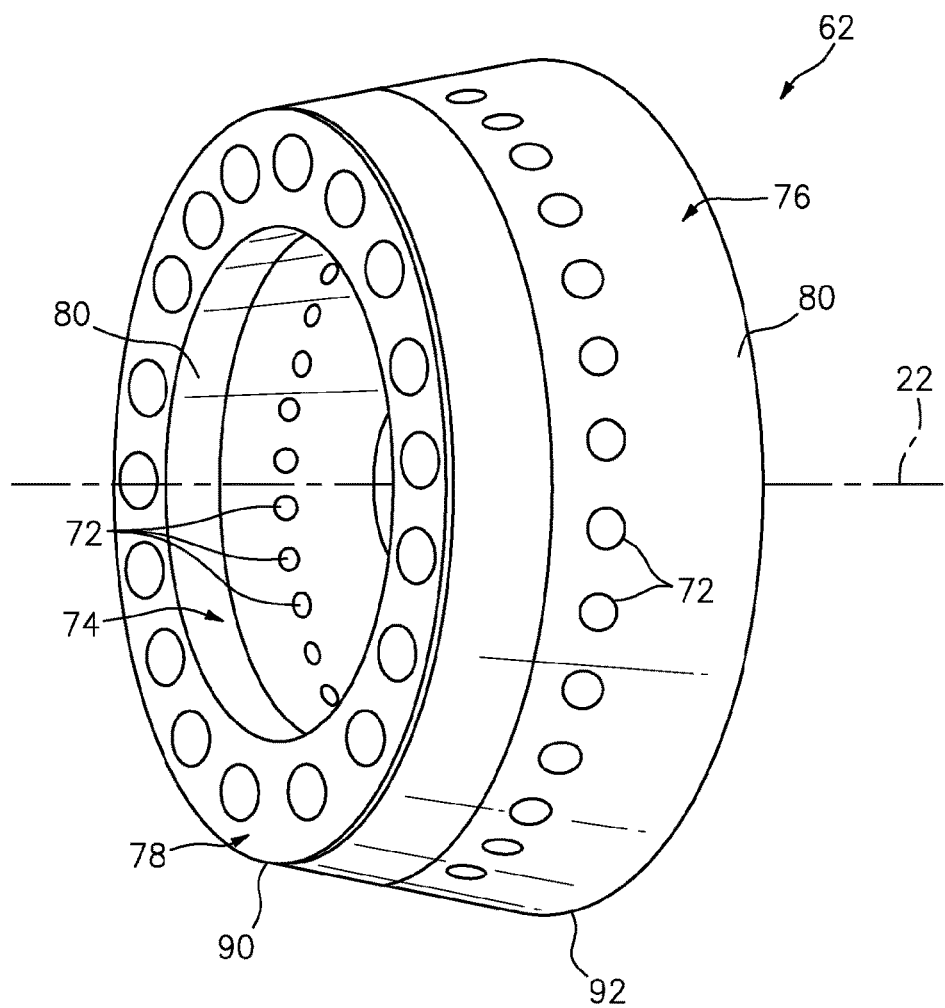
FIG. 3 is a perspective illustration of a portion of a combustor.

The combustor 62 may be configured as an annular floating wall combustor as illustrated in FIG. 3. The combustor 62 of FIGS. 2 and 3, for example, includes an annular combustor bulkhead 78, the tubular combustor inner wall 74, and the tubular combustor outer wall 76. The bulkhead 78 extends vertically (e.g., radially) between and is connected to the inner wall 74 and the outer wall 76. The inner wall 74 and the outer wall 76 each extends longitudinally (e.g., axially) along the centerline 22 from the bulkhead 78 towards the HPT section 31A, thereby defining the combustion chamber 56.

Each of the combustor walls 74 and 76 may be a multi-walled structure; e.g., a hollow dual-walled structure. Each combustor wall 74, 76 of FIG. 2, for example, includes a tubular combustor shell 80 and a tubular combustor heat shield 82 with one or more cooling cavities 84-86 (e.g., impingement cavities) between the shell 80 and the heat shield 82. Each combustor wall 74, 76 may also include one or more annular quench aperture bodies 88 (e.g., quench aperture grommets). These quench aperture bodies 88 are disposed circumferentially around the centerline 22. Each quench aperture body 88 partially or completely defines a respective one of the quench apertures 72.

The shell 80 extends circumferentially around the centerline 22. The shell 80 extends longitudinally along the centerline 22 between an upstream and forward end 90 and a downstream and aft end 92. The shell 80 is connected to the bulkhead 78 at the forward end 90. The shell 80 may be connected to a stator vane assembly 94 or the HPT section 31A at the aft end 92.

Figure 4:
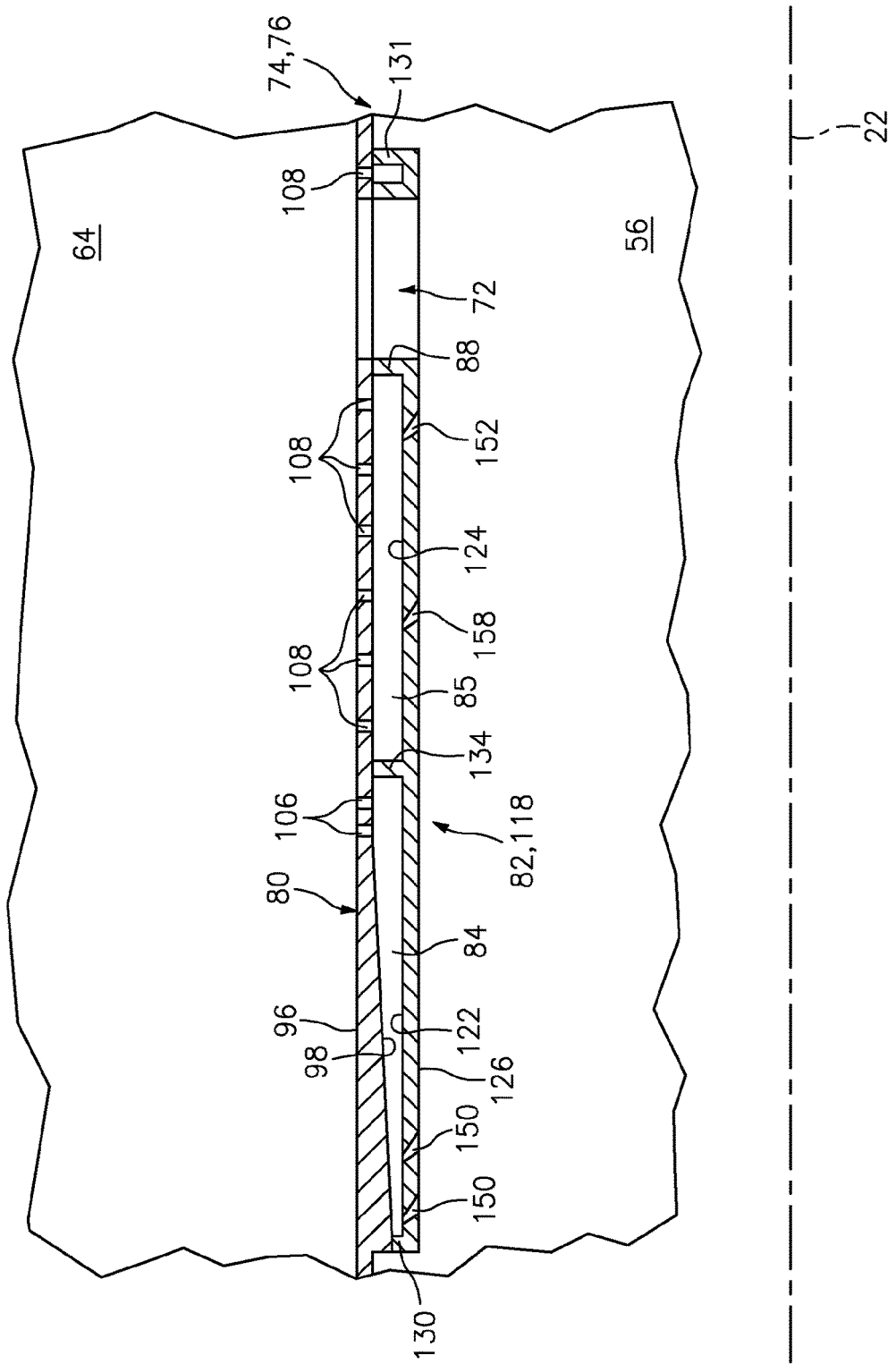
FIG. 4 is a side sectional illustration of a portion of a combustor wall.
Figure 5:
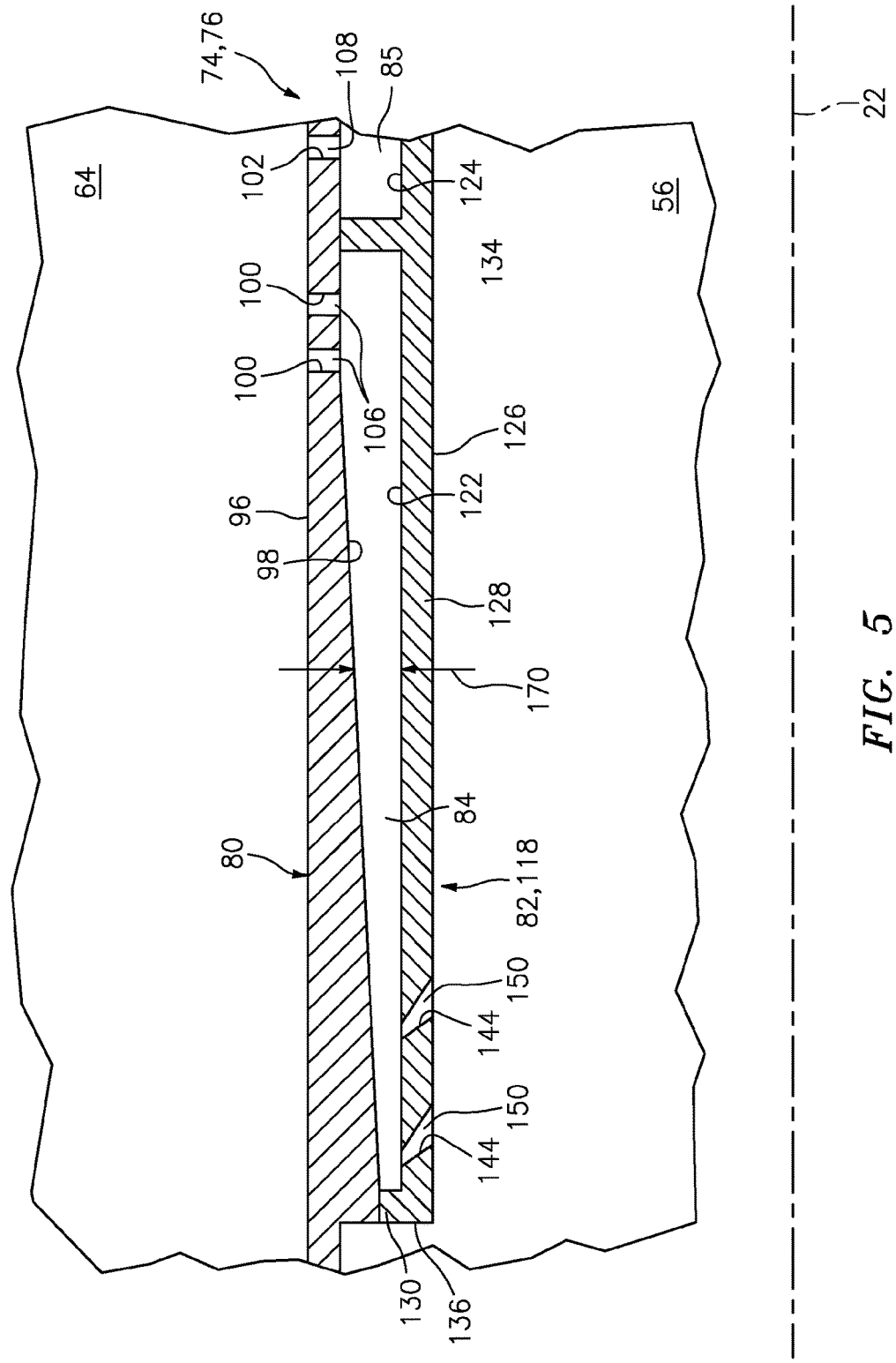
FIG. 5 is a side sectional illustration of a forward and/or upstream portion of the combustor wall of FIG. 4.
Figure 6:
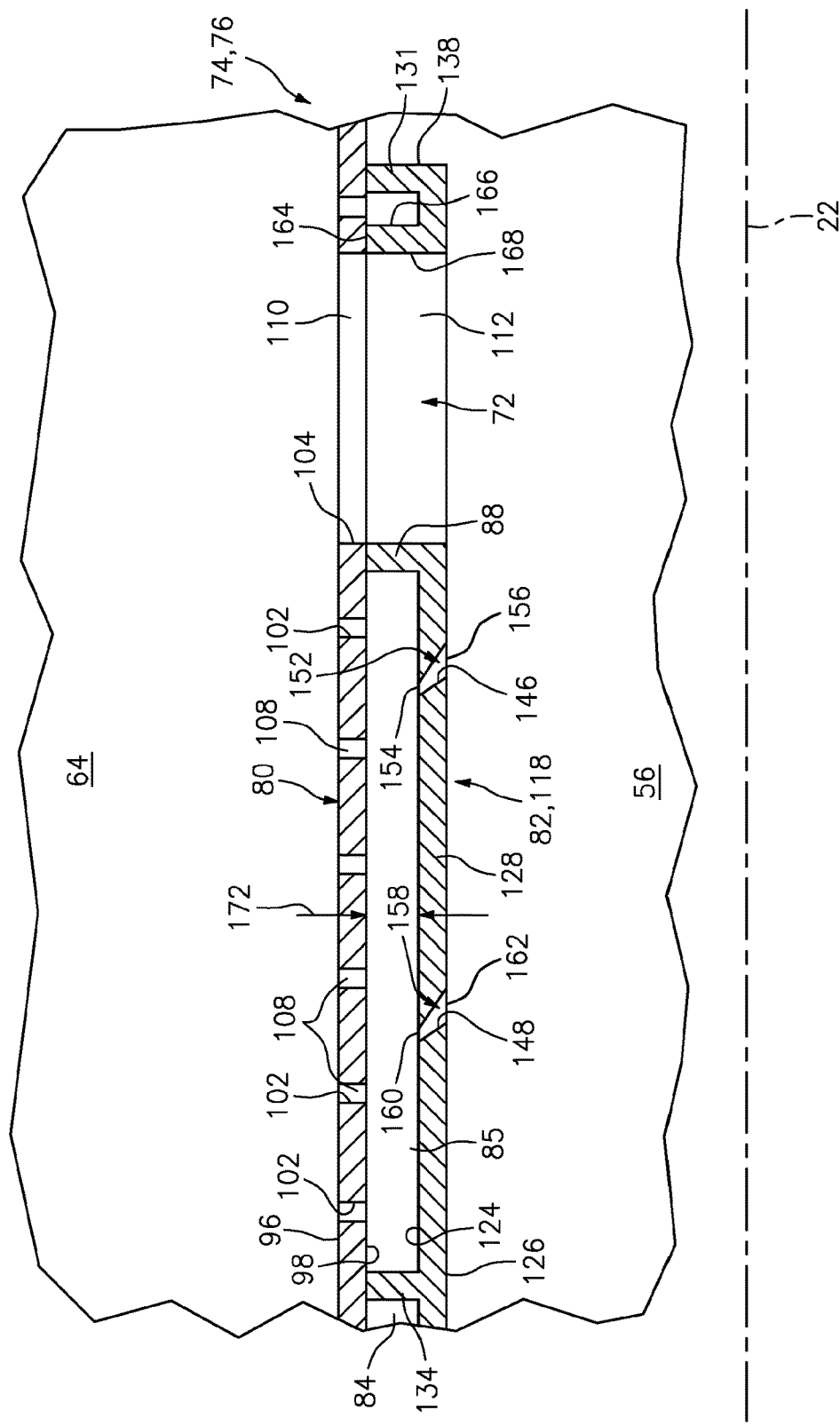
FIG. 6 is a side sectional illustration of an aft and/or downstream portion of the combustor wall of FIG. 4.

Referring to FIGS. 4-6, the shell 80 has an exterior surface 96, an interior surface 98, one or more aperture surfaces 100 (see FIG. 5), one or more aperture surfaces 102 (see FIG. 6), and one or more aperture surfaces 104 (see FIG. 6). At least a portion of the shell 80 extends vertically between the shell exterior surface 96 and the shell interior surface 98. The shell exterior surface 96, which may also be referred to as a plenum surface, defines a portion of a boundary of the plenum 64. The shell interior surface 98, which may also be referred to as a cavity surface, defines a portion of a boundary of one or more of the cooling cavities 84-86 (see also FIG. 2).

Referring to FIG. 5, the aperture surfaces 100 may be arranged in one or more arrays disposed along the centerline 22. The aperture surfaces 100 in each array may be arranged circumferentially around the centerline 22. Each of the aperture surfaces 100 defines a cooling aperture 106 (see also FIG. 4). This cooling aperture 106 extends vertically through the shell 80 from the shell exterior surface 96 to the shell interior surface 98. The cooling aperture 106 may be configured as an impingement aperture. Each aperture surface 100 of FIG. 5, for example, is configured to direct a jet of cooling air to impinge (e.g., substantially perpendicularly) against the heat shield 82.

Referring to FIG. 6, the aperture surfaces 102 may be arranged in one or more arrays disposed along the centerline 22. The aperture surfaces 102 in each array may be arranged circumferentially around the centerline 22. Each of the aperture surfaces 102 defines a cooling aperture 108 (see also FIG. 4). This cooling aperture 108 extends vertically through the shell 80 from the shell exterior surface 96 to the shell interior surface 98. The cooling aperture 108 may be configured as an impingement aperture. Each aperture surface 102 of FIG. 6, for example, is configured to direct a jet of cooling air to impinge (e.g., substantially perpendicularly) against the heat shield 82.

The aperture surfaces 104 may be arranged circumferentially around the centerline 22 in an array. Each aperture surface 104 defines an aperture 110. This aperture 110 extends vertically through the shell 80 from the shell exterior surface 96 to the shell interior surface 98. The aperture surface 104 of FIG. 6 is configured such that the aperture 110 may be aligned with an aperture 112 defined by a respective one of the quench aperture bodies 88, where the apertures 110 and 112 may collectively form a respective one of the quench apertures 72. Alternatively, the aperture surface 104 may be configured such that the aperture 110 receives a respective one of the quench aperture bodies 88.

Referring to FIG. 2, the heat shield 82 extends circumferentially around the centerline 22. The heat shield 82 extends longitudinally along the centerline 22 between an upstream and forward end and a downstream and aft end. The forward end is located at an interface between the combustor wall 74, 76 and the bulkhead 78. The aft end may be located at an interface between the combustor wall 74, 76 and the stator vane assembly 94 and/or the HPT section 31A.

The heat shield 82 may include a plurality of panel arrays 114 and 116 sequentially arranged along the centerline 22. Each of these panel arrays 114 and 116 respectively includes a plurality of panels 118 and 120. The panels 118, 120 in each array 114, 116 are disposed circumferentially around the centerline 22 and generally form a hoop. The heat shield 82 may also or alternatively be configured from a plurality of tubular panels sequentially arranged along the centerline 22; e.g., one or more of the panel arrays 114 and/or 116 may each be replaced with a tubular body.

Figure 7:
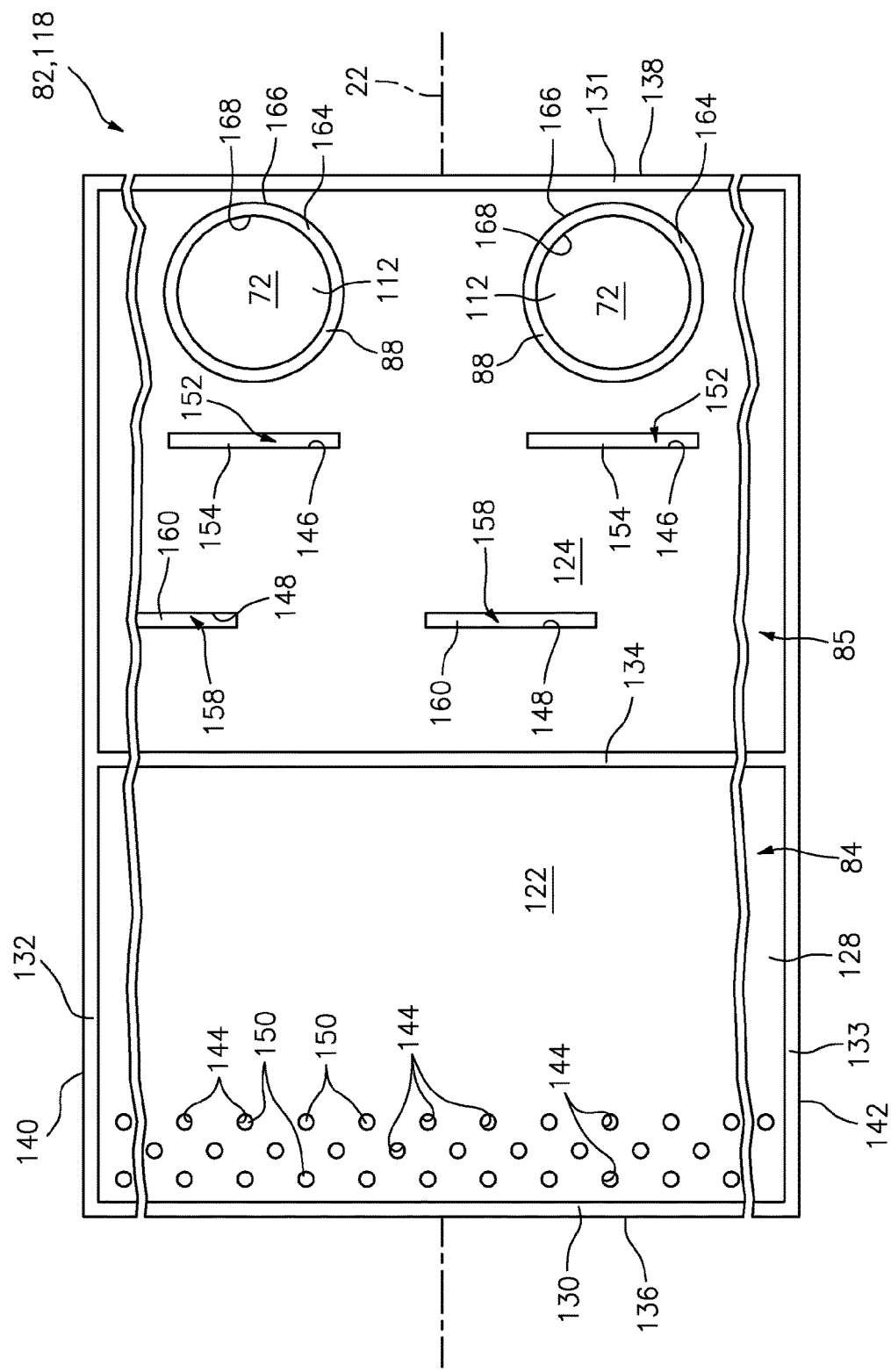
FIG. 7 is an illustration of an interior side of a heat shield panel for the combustor wall.

Referring to FIGS. 5-7, each of the panels 118 has one or more interior surfaces 122 and 124 and an exterior surface 126. At least a portion of the panel 118 extends vertically between the interior surfaces 122 and 124 and the exterior surface 126. Each interior surface 122, which may also be referred to as a cavity surface, defines a portion of a boundary of a respective one of the cooling cavities 84. Each interior surface 124, which may also be referred to as a cavity surface, defines a portion of a boundary of a respective one of the cooling cavities 85. The exterior surface 126, which may also be referred to as a chamber surface, defines a portion of a border of the combustion chamber 56.

Each panel 118 includes a panel base 128 and one or more panel rails 130-134. The panel base 128 and the panel rails 130 and 132-134 may collectively define the interior surface 122. The panel base 128 and the panel rails 131-134 may collectively define the interior surface 124. The panel base 128 may define the exterior surface 126.

The panel base 128 may be configured as a generally curved (e.g., arcuate) plate. The panel base 128 extends longitudinally between a longitudinal forward end 136 and a longitudinal aft end 138. The panel base 128 extends laterally (e.g., circumferentially) between opposing lateral ends 140 and 142.

The panel rails may include one or more longitudinal end rails 130 and 131 and one more lateral end rails 132 and 133. The panel rails also include at least one longitudinal intermediate rail 134. Each of the panel rails 130-134 of the inner wall 74 extends vertically in from the respective panel base 128; see FIG. 2. Each of the panel rails 130-134 of the outer wall 76 extends vertically out from the respective panel base 128; see FIG. 2.

The end and intermediate rails 130, 131 and 134 extend laterally between and are connected to the end rails 132 and 133. The end rail 130 is arranged at (e.g., on, adjacent or proximate) the forward end 136. The end rail 131 is arranged at the aft end 138. The intermediate rail 134 is disposed longitudinally (e.g., approximately midway) between the end rails 130 and 131. The end rail 132 is arranged at the lateral end 140. The end rail 133 is arranged at the lateral end 142.

Each of the panels 118 also includes one or more aperture surfaces 144, one or more aperture surfaces 146 and one or more aperture surfaces 148. Referring to FIGS. 5 and 7, the aperture surfaces 144 may be arranged in one or more arrays disposed along the centerline 22. The aperture surfaces 144 in each array may be disposed partially about the centerline 22. Each of the aperture surfaces 144 defines a cooling aperture 150 (see also FIG. 4). This cooling aperture 150 extends vertically through the panel base 128 from an inlet in the panel interior surface 122 to an outlet in the panel exterior surface 126. The cooling aperture 150 may be configured as an effusion aperture. Each aperture surface 144 of FIG. 5, for example, is configured to direct a jet of cooling air into the combustion chamber 56 to film cool a downstream portion of the heat shield 82; e.g., a downstream portion of the panel 118. Each aperture surface 144 may extend along a centerline that is acutely angled (e.g., between about 20° and 45°) relative to one or more of the surfaces 122 and 126.

Referring to FIGS. 6 and 7, the aperture surfaces 146 may be disposed partially about the centerline 22 in an array. Each of the aperture surfaces 146 defines a cooling aperture 152 (see also FIG. 4); e.g., a laterally elongated slot. This cooling aperture 152 extends vertically through the panel base 128 from an inlet 154 in the panel interior surface 124 to an outlet 156 (e.g., a laterally elongated outlet) in the panel exterior surface 126. The cooling aperture 152 may be configured as an effusion aperture. Each aperture surface 146 of FIG. 6, for example, is configured to direct a film of cooling air into the combustion chamber 56 to film cool a downstream portion of the heat shield 82 (e.g., a downstream portion of the panel 118) proximate and/or adjacent a respective one of the quench apertures 72. Each aperture surface 146, for example, may be longitudinally forward and upstream of and approximately laterally aligned with a respective one of the quench apertures 72 as illustrated in FIG. 7. Each aperture surface 146 may extend along a centerline that is acutely angled (e.g., between about 20° and 45°) relative to one or more of the surfaces 124 and 126.

Referring again to FIGS. 6 and 7, the aperture surfaces 148 may be disposed partially about the centerline 22 in an array. Each of the aperture surfaces 148 defines a cooling aperture 158 (see also FIG. 4); e.g., a laterally elongated slot. This cooling aperture 158 extends vertically through the panel base 128 from an inlet 160 in the panel interior surface 124 to an outlet 162 (e.g., a laterally elongated outlet) in the panel exterior surface 126. The cooling aperture 158 may be configured as an effusion aperture. Each aperture surface 148 of FIG. 6, for example, is configured to direct a film of cooling air into the combustion chamber 56 to film cool a downstream portion of the heat shield 82 (e.g., a downstream portion of the panel 118) proximate and/or adjacent a respective one of the quench apertures 72. Each aperture surface 148, for example, may be longitudinally forward and upstream of and laterally offset from a respective on of the aperture surfaces 146 and, thus, a respective one of the quench apertures 72 as illustrated in FIG. 7. In this manner, the film of cooling air discharged from the outlet 162 may be superimposed with the film of cooling air discharged from the respective outlet 156 and flow towards the respective quench aperture 72 where, for example, the core air moves circumferentially within the combustion chamber 56. Each aperture surface 148 may extend along a centerline that is acutely angled (e.g., between about 20° and 45°) relative to one or more of the surfaces 124 and 126.

Each of the quench aperture bodies 88 may be formed integral with (or attached to) a respective one of the panel bases 128. One or more of the quench aperture bodies 88 are located laterally within and extend vertically through a respective one of the cooling cavities 85. One or more of the quench aperture bodies 88, for example, may be arranged laterally between the lateral end rails 132 and 133 of a respective one of the panels 118. One or more of the quench aperture bodies 88 may be arranged longitudinally between the end and intermediate rails 131 and 134 of a respective one of the panels 118.

Each quench aperture body 88 extends vertically from the panel base 128 to a distal end surface 164. The quench aperture body 88 extends laterally between a body outer surface 166 and a body inner surface 168, which at least partially defines a respective one of the quench apertures 72 in the combustor wall 74, 76. The body inner surface 168, for example, may be aligned with a respective one of the aperture surfaces 104 and defines the aperture 112, which extends vertically through the panel 118 from the end surface 164 to the exterior surface 126.

Referring to FIG. 2, the heat shield 82 of the inner wall 74 circumscribes the shell 80 of the inner wall 74, and defines an inner side of the combustion chamber 56. The heat shield 82 of the outer wall 76 is arranged radially within the shell 80 of the outer wall 76, and defines an outer side of the combustion chamber 56 that is opposite the inner side.

The heat shield 82 is attached to the respective shell 80 thereby forming the cooling cavities 84-86 in each combustor wall 74, 76. The panels 118 and 120, for examples, may be respectively fastened to the shells by a plurality of mechanical attachments. These mechanical attachments are not shown in the drawings for ease of illustration. However, various mechanical attachments are known in the art and the present invention is not limited to any particular type or configuration thereof. In addition, in other embodiments, the heat shield 82 may also or alternatively be bonded to the shell 80.

Referring to FIGS. 5 and 7, each of the cooling cavities 84 fluidly couples one or more of the cooling apertures 106 with one or more of the cooling apertures 150 and their outlets. Each cooling cavity 84, for example, is defined and extends longitudinally between the end and intermediate rails 130 and 134 a respective one of the panels 118. Each cooling cavity 84 is defined and extends laterally between the end rails 132 and 133 of a respective one of the panels 118.

Referring to FIG. 5, each cooling cavity 84 extends vertically between the interior surface 98 and the interior surface 122 of a respective one of the panels 118, thereby defining a vertical height 170 of the cooling cavity 84. This height 170 may change (e.g., increase) as the heat shield 82 extends longitudinally approximately from the end rail 130 to the intermediate rail 134. The height 170 adjacent the end rail 130, for example, may be less than (e.g., between about ½ to 1/16) the height 170 adjacent the intermediate rail 143. Each cooling cavity 84 therefore may have a vertically tapered geometry.

The cooling cavity tapered geometry may be defined by respective opposing portions of the shell 80 and the heat shield 82. These shell and heat shield portions, for example, may vertically converge towards one another as the combustor wall 74, 76 extends in a forward and upstream direction. The thickness of the shell 80, more particularly, may increase as the combustor wall 74, 76 extends in the forward and upstream direction.

Referring to FIGS. 6 and 7, each of the cooling cavities 85 fluidly couples one or more of the cooling apertures 108 with one or more of the cooling apertures 152 and 158 and their outlets 156 and 162. Each cooling cavity 85, for example, is defined and extends longitudinally between the intermediate and end rails 131 and 134 a respective one of the panels 118. Each cooling cavity 85 is defined and extends laterally between the end rails 132 and 133 of a respective one of the panels 118. Each cooling cavity 85 extends vertically between the interior surface 98 and the interior surface 124 of a respective one of the panels 118, thereby defining a vertical height 172 (see FIG. 6) of the cooling cavity 85. This height 172 may be substantially constant as the heat shield 82 extends longitudinally between the end and intermediate rails 131 and 134.

During operation of the combustor wall 74, 76 of FIG. 4, the shell 80 directs core air from the plenum 64 into each cooling cavity 84 through the respective cooling apertures 106. This core air (e.g., cooling air) impinges against and thereby impingement cools respective portions of the heat shield panels 118 proximate the intermediate rail 134. The cooling air within each cooling cavity 84 is accelerated towards the cooling apertures 150 and the end rail 134 by the converging interior surfaces 98 and 122. By accelerating the cooling air, convective heat transfer from the heat shield 82 to the cooling air and then from the cooling air to the shell 80 may be increased. The heat shield 82 subsequently directs (e.g., effuses) the accelerated cooling air out of the combustor wall 74, 76 through the cooling apertures 150 and into the combustion chamber 56 to film cool downstream portions of the respective heat shield panel 118.

Downstream portions of the heat shield panels 118 may be subject to higher core air temperatures within the combustion chamber 56 than upstream portions of the heat shield panels 118. The combustor wall 74, 76 may accommodate this temperature differential, however, since the shell 80 directs the core air to impinge against the heat shield 82 proximate the intermediate rail 134. Portions of each heat shield panel 118 proximate the intermediate rail 134 therefore receives additional cooling as compared to portions of the heat shield panel 118 proximate the end rail 130. In addition to the foregoing, by accelerating the cooling air through each cooling cavity 84 and thereby increasing convective heat transfer, the combustor wall 74, 76 may utilize less of the core air within the plenum 64 for cooling and thereby increase engine efficiency.

The shell 80 also directs core air from the plenum 64 into each cooling cavity 85 through the respective cooling apertures 108. This core air (e.g., cooling air) impinges against and thereby impingement cools respective portions of the heat shield panels 118. The heat shield 82 subsequently directs (e.g., effuses) the cooling air out of the combustor wall 74, 76 through the cooling apertures 152 and 158 and into the combustion chamber 56 to film cool downstream portions of the heat shield 82; e.g., the respective heat shield panel 118.

Referring to FIG. 6, the cooling air discharged from each cooling aperture 154, 158 may form an air blanket against the exterior surface 126 that flows along a longitudinal path towards a respective one of the quench apertures 72. This air blanket may provide a thermal barrier between portions of the heat shield 82 adjacent and/or proximate the quench aperture 72 and the relatively hot core air within the combustion chamber 56. The air blanket may also convectively cool the respective portion(s) of the heat shield 82.

Figure 8:
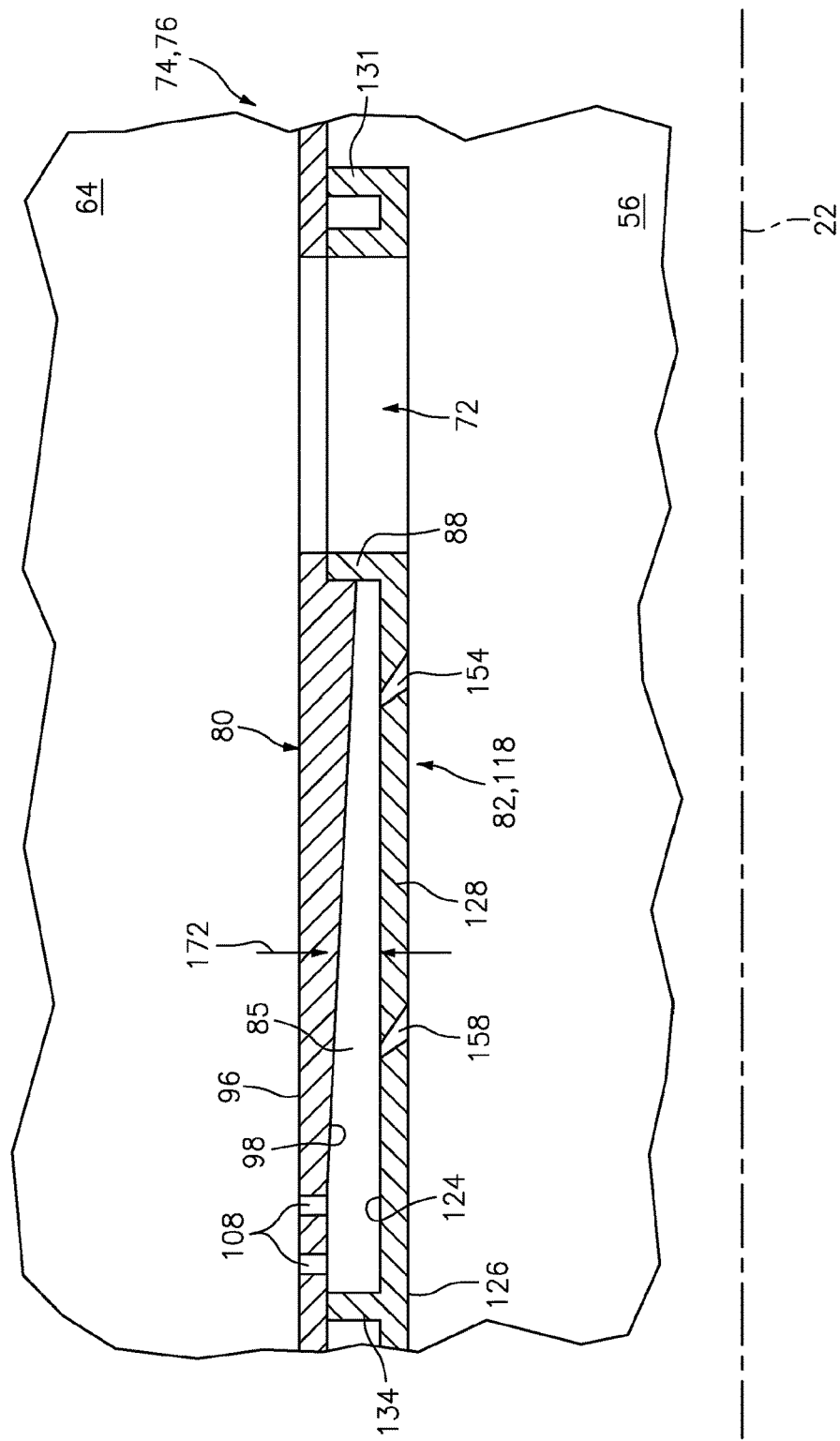
FIG. 8 is a side sectional illustration of an alternate embodiment aft and/or downstream portion of the combustor wall.

In some embodiments, referring to FIG. 8, one or more of the combustor walls 74 and 76 may each be configured to provide one or more of the cavities 85 with a tapered geometry. The vertical height 172, for example, may change (e.g., decrease) as the heat shield 82 extends longitudinally approximately from the intermediate rail 134 to the end rail 131. The height 172 at the quench aperture body 88, for example, may be less than (e.g., between about ½ to 1/16) the height 172 adjacent the intermediate rail 134.

The cooling cavity 85 tapered geometry may be defined by respective opposing portions of the shell 80 and the heat shield 82. These shell and heat shield portions, for example, may vertically converge towards one another as the combustor wall 74, 76 extends in an aft and downstream direction. The thickness of the shell 80, for example, may increase as the combustor wall 74, 76 extends in the aft and downstream direction.

Figure 9:
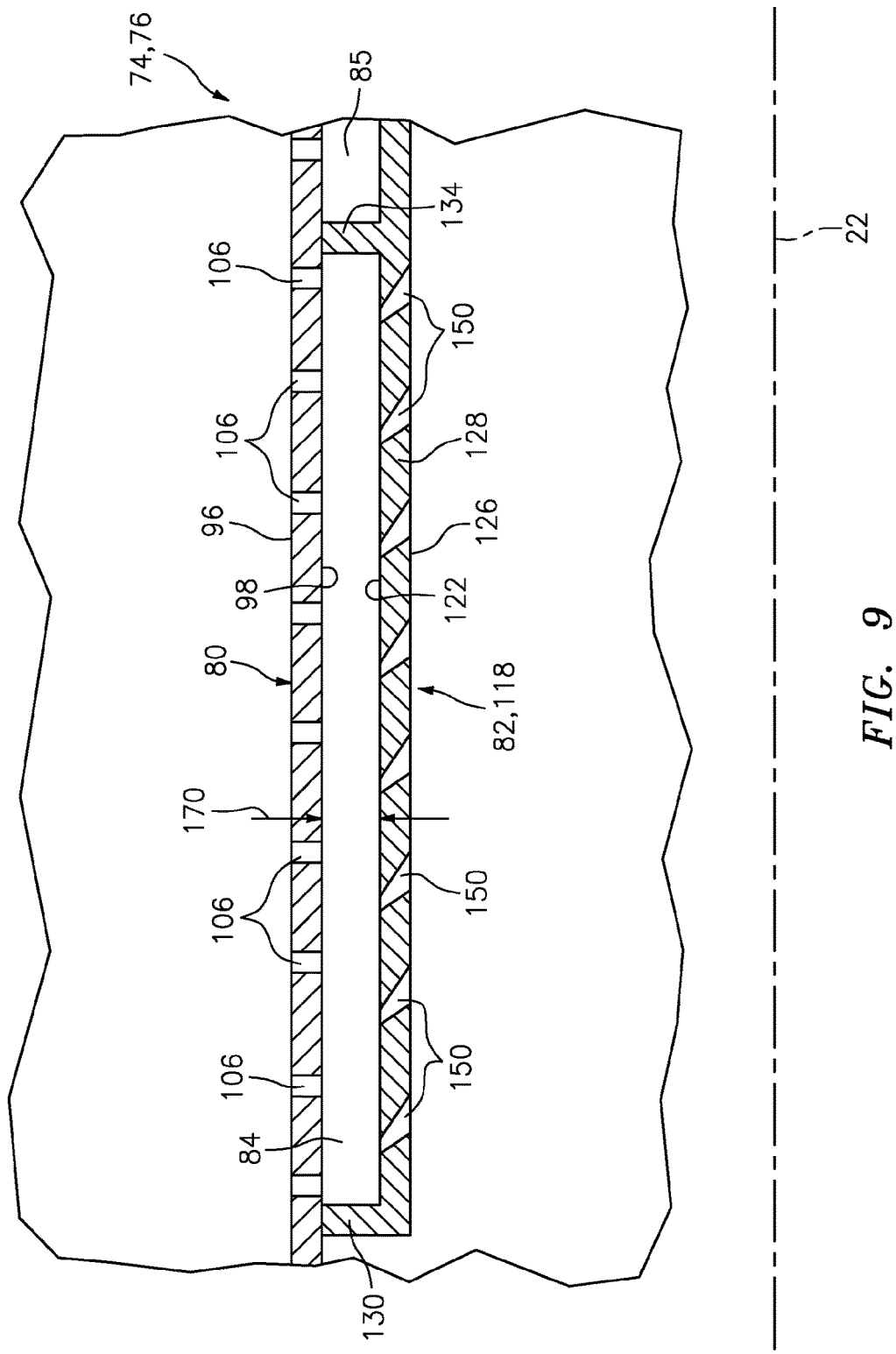
FIG. 9 is a side sectional illustration of an alternate embodiment forward and/or upstream portion of the combustor wall.

In addition to the foregoing, one or more of the combustor walls 74 and 76 may each be configured to provide one or more of the cavities 84 with a non-tapered geometry as illustrated in FIG. 9. The vertical height 170, for example, may be substantially constant as the heat shield 82 extends between the longitudinal end and intermediate rails 130 and 134. The thickness of the shell 80, for example, may be substantially constant.

Figure 10:
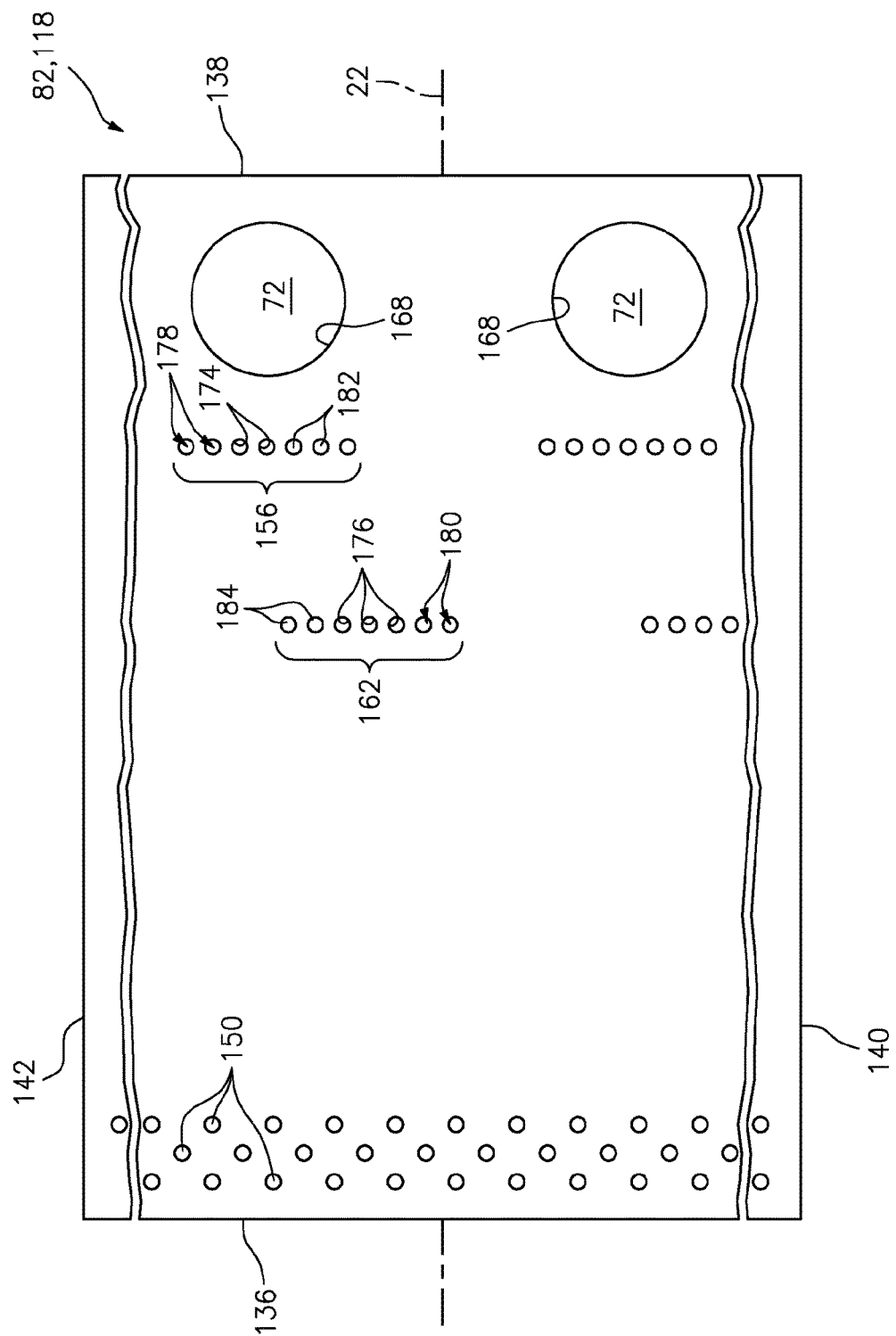
FIG. 10 is an illustration of an exterior side of an alternate embodiment heat shield panel for the combustor wall.

In some embodiments, referring to FIG. 10, one or more of the outlets 156, 162 may each be collectively formed by a plurality of respective aperture surfaces 174, 176 and cooling apertures 178, 180 defined thereby. More particularly, respective cooling aperture outlets 182 formed by a subset of the aperture surfaces 174 may collectively form the respective elongated outlet 156. Similarly, cooling aperture outlets 184 formed by a subset of the aperture surfaces 176 may collectively form the respective elongated outlet 162.

One or more of the combustor walls 74 and 76 may each have different configurations other than those described above. For example, the heat shield 82 may also or alternatively have a changing thickness to provide one or more of the cavities 84 and/or 85 with its tapered geometry. The shell 80 and/or the heat shield 82 may each include a curved and/or compound concavity to provide one or more of the cavities 84 and/or 85 with its tapered geometry. One or more cavities may be defined longitudinally between the cavities 84 and 85. One or more of the cooling apertures may have cross-sectionals other than those described above and illustrated in the figures. For example, one or more of the cooling apertures may each have a circular or non-circular cross-section. Examples of a non-circular cross-section include, but are not limited to, an oval cross-section, an elliptical cross-section, a pear-shaped cross-section, a teardrop cross-section, a polygonal (e.g., rectangular) cross-section, or any other symmetric or asymmetric shaped cross-section with, for example, its major axis aligned (e.g., parallel) with the centerline 22. One or more of the panels 118 may be configured without any quench aperture bodies 88. The present invention therefore is not limited to any particular combustor wall configurations.

The terms "forward", "aft", "inner", "outer", "vertical", lateral" and "longitudinal" are used to orientate the components of the turbine engine assembly 60 and the combustor 62 described above relative to the turbine engine 20 and its axial centerline 22. One or more of these turbine engine components, however, may be utilized in other orientations than those described above. The present invention therefore is not limited to any particular spatial orientations.

The turbine engine assembly 60 may be included in various turbine engines other than the one described above. The turbine engine assembly 60, for example, may be included in a geared turbine engine where a gear train connects one or more shafts to one or more rotors in a fan section, a compressor section and/or any other engine section. Alternatively, the turbine engine assembly 60 may be included in a turbine engine configured without a gear train. The turbine engine assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

The term "at" may be used above to locate a respective component/element relative to another component/element or location. Unless stated otherwise, the term "at" may encompass the terms "on", "adjacent" and "proximate". For example, a component described above as being located at an end of another component may be located on, adjacent or proximate the end of the other component.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. An assembly for a turbine engine, the assembly comprising:
   a combustor wall extending longitudinally along a centerline, the combustor wall including a shell and a heat shield, and the combustor wall defining a first cavity and a second cavity between the shell and the heat shield;
   the heat shield defining a first outlet and a laterally elongated second outlet, the first outlet fluidly coupled with the first cavity, and the second outlet fluidly coupled with the second cavity;
   wherein the combustor wall defines one of the first cavity and the second cavity with a tapered geometry; and wherein a thickness of the shell changes as the combustor wall extends longitudinally along the one of the first cavity and the second cavity.

2. The assembly of claim 1, wherein the combustor wall defines a quench aperture through the shell and the heat shield; and the heat shield is configured to direct cooling air from the second cavity through the second outlet and towards the quench aperture.

3. The assembly of claim 2, wherein the heat shield defines a third outlet fluidly coupled with the second cavity, and is configured to direct additional cooling air from the second cavity through the third outlet and towards the quench aperture.

4. The assembly of claim 3, wherein the second outlet and the third outlet are staggered.

5. The assembly of claim 1, wherein the heat shield defines an elongated aperture therethrough that at least partially forms the second outlet.

6. The assembly of claim 1, wherein the heat shield defines a plurality of apertures therethrough that at least partially form the second outlet.

7. The assembly of claim 1, wherein the shell and the heat shield converge towards one another thereby at least partially defining the respective one of the first cavity and the second cavity with the tapered geometry.

8. The assembly of claim 1, wherein the heat shield includes a rail that partially defines the first cavity and the second cavity.

9. The assembly of claim 1, wherein the combustor wall defines the first cavity with the tapered geometry.

10. The assembly of claim 1, wherein the combustor wall defines the second cavity with the tapered geometry.

11. The assembly of claim 1, wherein
the shell defines an aperture therethrough; and
the shell is configured to direct cooling air into the first cavity through the aperture to impinge against the heat shield.

12. The assembly of claim 1, wherein
the shell defines an aperture therethrough; and
the shell is configured to direct cooling air into the second cavity through the aperture to impinge against the heat shield.

13. The assembly of claim 1, wherein the heat shield includes a plurality of heat shield panels, and one of the heat shield panels defines the first outlet and the second outlet.

14. The assembly of claim 1, wherein the second outlet extends radially through a panel of the heat shield.

15. An assembly for a turbine engine, the assembly comprising:
a combustor wall extending axially along a centerline, the combustor wall including a shell and a heat shield, the combustor wall defining a first cavity and a second cavity between the shell and the heat shield, and the combustor wall defining a quench aperture through the shell and the heat shield;
the heat shield configured to effuse cooling air out of the combustor wall from the first cavity, and configured to direct cooling air out of the combustor wall from the second cavity towards the quench aperture;
wherein the combustor wall is configured to accelerate the cooling air through one or both of the first cavity and the second cavity;
wherein the heat shield includes a first rail and a second rail;
wherein one of the first cavity and the second cavity extends axially between the first rail and the second rail; and
wherein a height of the one of the first cavity and the second cavity changes as the heat shield extends axially from the first rail to the second rail.

16. The assembly of claim 15, wherein
the one of the first cavity and the second cavity is the first cavity;
the first cavity is adjacent to and upstream of the second cavity; and
the combustor wall is configured to accelerate the cooling air through the first cavity.

17. The assembly of claim 15, wherein
the one of the first cavity and the second cavity is the second cavity;
the first cavity is adjacent to and upstream of the second cavity; and
the combustor wall is configured to accelerate the cooling air through the second cavity.

18. The assembly of claim 15, wherein the shell is configured to direct the cooling air into the first cavity and the second cavity to impinge against the heat shield.

19. The assembly of claim 15, wherein the shell and the heat shield converge towards one another thereby at least partially defining the one of the first cavity and the second cavity with a tapered geometry.

20. The assembly of claim 15, wherein a panel of the heat shield is configured with a circumferentially elongated aperture through which the cooling air is directed from the second cavity and to the quench aperture.

* * * * *